E. CHURCHILL, Jr. & C. N. COWAN.
SPINDLE BEARING.
APPLICATION FILED JUNE 14, 1915.
1,181,992.
Patented May 9, 1916.
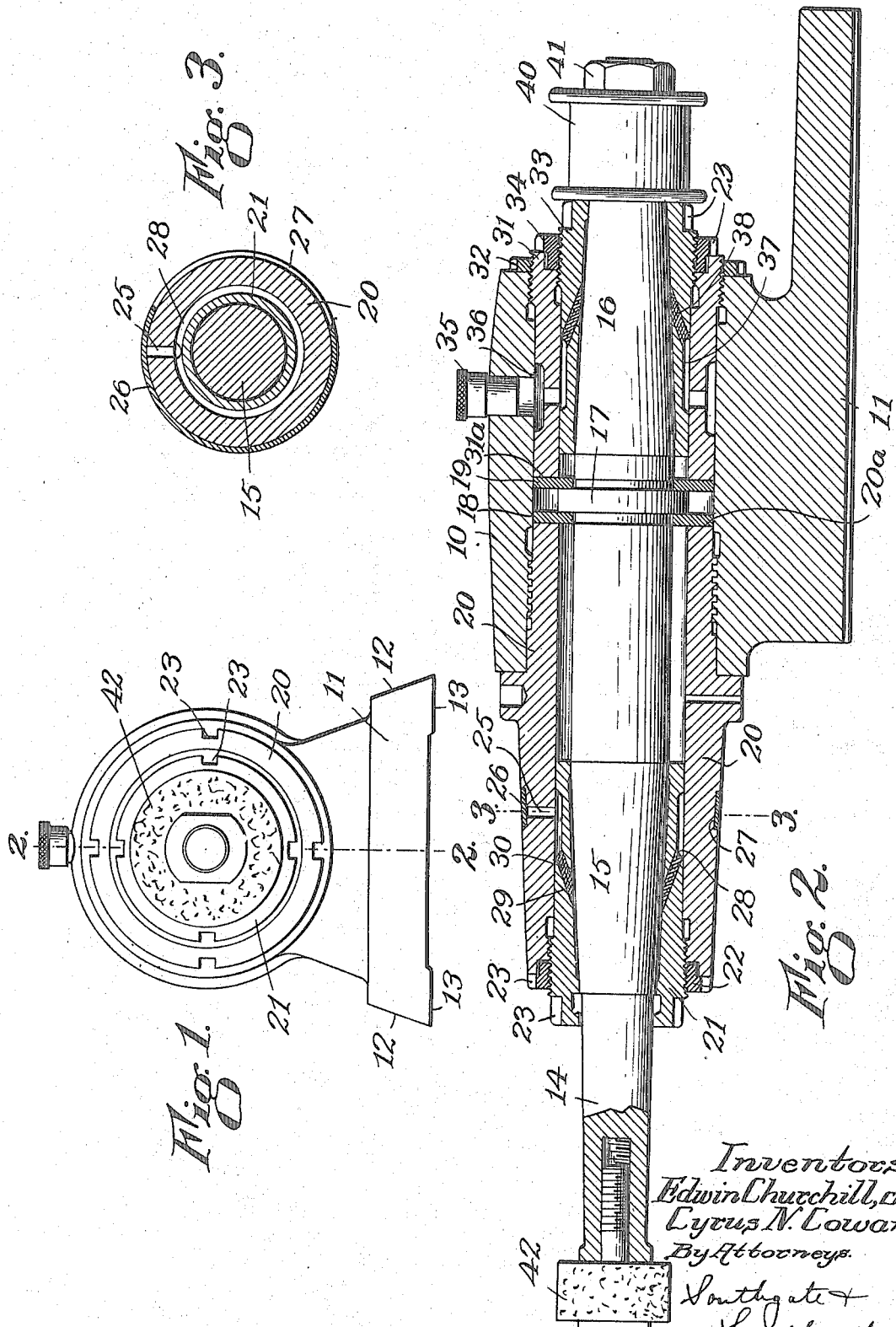
Inventors
Edwin Churchill, Jr.
Cyrus N. Cowan.
By Attorneys
Southgate &
Southgate

UNITED STATES PATENT OFFICE.

EDWIN CHURCHILL, JR., AND CYRUS N. COWAN, OF WORCESTER, MASSACHUSETTS, ASSIGNORS TO HEALD MACHINE COMPANY, A CORPORATION OF MASSACHUSETTS.

SPINDLE-BEARING.

1,181,992.

Specification of Letters Patent.

Patented May 9, 1916.

Application filed June 14, 1915. Serial No. 33,894.

*To all whom it may concern:*

Be it known that we, EDWIN CHURCHILL, Jr., and CYRUS N. COWAN, citizens of the United States, residing at Worcester, in the county of Worcester and State of Massachusetts, have invented a new and useful Spindle-Bearing, of which the following is a specification.

This invention relates to a spindle bearing and more particularly to a bearing adapted for supporting a light high speed grinding wheel spindle.

It is the object of our invention to improve the construction of such bearings, attaining by our improvements simplicity of construction, economy of manufacture, and increased efficiency in operation.

With this object in view our invention relates to certain devices, arrangements and combinations of parts which will be hereinafter described and more particularly pointed out in the appended claims.

A preferred form of our invention is shown in the drawings, in which—

Figure 1 is an end elevation of our improved bearing; Fig. 2 is a longitudinal sectional view taken substantially along the line 2—2 in Fig. 1; and Fig. 3 is a detail sectional view taken along the line 3—3 in Fig. 2.

We have shown our improved bearing as supported by a frame or casing 10 which may be of any desired form and which may be provided with a base 11 having guiding surfaces 12 and 13 by which the spindle frame may be secured in correct alinement upon any suitable bed.

The spindle is indicated at 14 and is provided with a tapered bearing portion 15, a second reversely-tapered bearing portion 16, and a radially-extending flange 17 disposed between the bearing portions 15 and 16. The end thrust of the spindle is designed to be received by the flange 17 which in the preferred form engages anti-friction disks 18 and 19 upon its two side faces. A shell 20 is firmly secured in any convenient manner within one end of a cylindrical recess in the frame 10. As shown in the drawing the shell 20 is threaded into the recess in the frame 10. The inner end surface 20ª of the shell 20 is positioned to engage one side surface of the flange 17 or of the anti-friction disk 18 adjacent said flange. The shell 20 thus determines the longitudinal position of the spindle in one direction.

The shell 20 is internally threaded at its outer end to receive a tapered bearing sleeve 21 which is longitudinally adjustable within the shell 20 by angular movement of said sleeve and which is retained in adjusted angular and longitudinal position by a check nut 22 threaded upon the sleeve 21 and engaging the outer end of the shell 20. Both the check nut and the sleeve may be provided with suitable notches 23 to which a spanner or wrench may be applied for adjustment. To permit the lubrication of this tapered bearing, we provide an oil hole 25 normally covered by a flat spring ring 26 fitting within an annular groove 27 formed in the outer surface of the shell 20. The ring may be provided with a knurled outer surface to facilitate movement thereof. The oil well 25 communicates with a circumferential oil groove 28 extending entirely around the sleeve 21 and also extended longitudinally along said sleeve a sufficient distance to permit longitudinal adjustment of the sleeve without preventing the flow of oil from the oil hole 25 into the groove 28.

A series of inclined holes 29 afford passages from the oil groove 28 to the tapered spindle bearing and for very high speed work it is found necessary to substantially close the oil holes 29 by wooden blocks 30 which permit a substantial amount of oil to reach the bearing but prevent the oil from being forced back into the oil groove under the influence of centrifugal force. A second shell 31 is threaded into the right hand end of the opening in the frame 10 (as viewed in Fig. 2), and is retained in adjusted longitudinal position by a check nut 32. The inner end surface 31ª of the shell 31 is positioned to engage one side surface of the flange 17 or of the anti-friction disk 19 adjacent thereto. The longitudinal movement or end play of the spindle 14 may thus be controlled by longitudinal adjustment of the shell 31. A second tapered bearing sleeve 33 is threaded into the recess of the shell 31 and may be adjusted longitudinally therein to secure the desired running fit on the tapered bearing portion 16 of the spindle 14. The sleeve 33 may be retained in adjusted position by tightening the check nut 34, and additional notches 23 are provided in the parts 32, 33 and 34 for easy adjustment thereof.

The provision for oiling the right hand tapered bearing includes an oil cap 35 communicating with a circumferential groove 36 on the outer surface of the shell 31, which groove in turn communicates with a groove 37 and oil holes 38 formed in the sleeve 33 and corresponding in function to the groove 28 and oil holes 29 previously described. The grooves 36 and 37 are each formed of such width as to permit longitudinal adjustment of the shell 31 and the sleeve 33. A driving pulley 40 may be secured to the spindle in any convenient manner, as by a lock nut 41, and a grinding wheel 42 may also be suitably secured to the opposite end of the spindle.

Reference to the drawings will show that the spindle bearing above described comprises a minimum number of parts and that each of these parts is adjustable by the use of very simple mechanism. The end play of the spindle is first limited by the adjustment of the shell 31 after which the tapered bearing sleeves 21 and 33 are adjusted longitudinally to secure the desired running fit of the spindle. The adjustment in every case is made by angularly moving a threaded member, by which method a very fine and accurate adjustment may be attained. After the desired adjustment is secured the locking of the several parts is similarly accomplished.

Having thus described our invention it will be evident that changes and modifications can be made therein by those skilled in the art without departing from the spirit and scope thereof as expressed in the claims and we do not wish to be otherwise limited to the details herein disclosed, but

What we claim is:—

1. A spindle bearing having, in combination, a spindle formed with opposed tapered bearing portions and having a radially-extending flange between said bearing portions, a supporting frame, a shell fixed therein, said shell having a portion coöperating with said flange to limit longitudinal movement of said spindle in one direction, a tapered bearing sleeve threaded into and longitudinally adjustable in said shell, a check nut to retain said sleeve in adjusted position, a second shell threaded into said frame and longitudinally adjustable therein, said second shell having a portion coöperating with said flange to limit longitudinal movement of said spindle in the opposite direction, means to retain said second shell in adjusted position, a second tapered bearing sleeve threaded into and longitudinally adjustable in said second shell, and a check nut to retain said second sleeve in adjusted longitudinal position, said two tapered sleeves constituting the running bearings of the spindle.

2. A spindle bearing having, in combination, a spindle formed with opposed tapered bearing portions and having a radially-extending flange between said bearing portions, a pair of anti-friction disks each engaging one side face of said flange, a supporting frame, a shell fixed therein and having a portion engaging the outer side of one of said disks, a tapered bearing sleeve threaded into and longitudinally adjustable in said shell, a check nut to retain said sleeve in adjusted position, a second shell threaded into said frame and longitudinally adjustable to bring the inner end of said second shell into engagement with the outer side of the second disk, means to retain said second shell in adjusted position, a second tapered bearing sleeve threaded into and longitudinally adjustable in said second shell, and a check nut to retain said second sleeve in adjusted longitudinal position.

In testimony whereof we have hereunto set our hands.

EDWIN CHURCHILL, Jr.
CYRUS N. COWAN.